United States Patent
Chowdhury et al.

(10) Patent No.: US 6,433,919 B1
(45) Date of Patent: Aug. 13, 2002

(54) METHOD AND APPARATUS FOR WAVELENGTH CONVERSION AND SWITCHING

(75) Inventors: Aref Chowdhury; Leon McCaughan, both of Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/575,040

(22) Filed: May 19, 2000

(51) Int. Cl.[7] .............................................. G02F 1/365
(52) U.S. Cl. ...................... 359/332; 359/326; 385/122
(58) Field of Search ................................ 359/326–332, 359/117, 127, 128; 385/122; 372/21–22

(56) References Cited

U.S. PATENT DOCUMENTS

| | | | |
|---|---|---|---|
| 5,036,220 A | 7/1991 | Byer et al. | 359/328 |
| 5,434,700 A | 7/1995 | Yoo | 359/332 |
| 5,739,949 A | 4/1998 | Rosencher et al. | 359/332 |
| 5,825,517 A | 10/1998 | Antoniades et al. | 359/117 |
| 5,838,702 A | 11/1998 | Byer et al. | 372/21 |
| 5,973,823 A | * 10/1999 | Koops et al. | 359/322 |
| 5,999,308 A | * 12/1999 | Nelson et al. | 359/326 X |
| 6,064,506 A | * 5/2000 | Koops | 359/237 |
| 6,278,105 B1 | * 8/2001 | Mattia | 359/326 X |
| 6,304,366 B1 | * 10/2001 | Scalora et al. | 359/328 |

OTHER PUBLICATIONS

Chowdhury et al, "Optical Wavelength Interchange Based on Nonlinear Photonic Crystals", Optical Fiber Communication Conference and Exhibit (2001), vol. 3, pp. WDD96–1 to WDD96–3, Mar. 21, 2001.*

T. Tamir, "Beam and Waveguide Couplers," in Topics in Applied Physics, vol. 7, Intergrated Optics, Springer Verlag, Berlin, 1979, pp. 83–93.

M.L. Bortz, et al., "Quasi–Phase–Matched Optical Parametric Amplification and Oscillation in Periodicially Poled $L_i$ $NbO_3$ Waveguides," Optics Letters, vol. 20, No. 1, Jan. 1, 1995, pp. 49–51.

V. Berger, "Nonlinear Photonic Crystals," Physical Review Letters, vol. 81, No. 19, Nov. 9, 1998, pp. 4136–4139.

N.G.R. Broderick, et al., "Hexagonally Poled Lithium Niobate: A Two–Dimensional Nonlinear Photonic Crystal," Physical Review Letters, vol. 84, No. 19, May 8, 2000, pp. 4345–4348.

* cited by examiner

*Primary Examiner*—John D. Lee
(74) *Attorney, Agent, or Firm*—Foley & Lardner (57) ABSTRACT

A two-dimensional second order nonlinear lattice formed in a lattice body is utilized for performing a one-step optical carrier wavelength interchange between pairs of input optical signals. The lattice body includes sensitized regions arranged in a two-dimensional array in a matrix material with the sensitized regions differing from the matrix material in the sign of the second order susceptibility. When an optical pump signal is coupled to the lattice body at a frequency corresponding to the sum of the frequencies of the two input signals, nonlinear interactions in the lattice body produce wavelength interchange between the input signals, resulting in angularly deflected optical signals exiting the lattice body in which the signal information on the input signals is interchanged between the carrier frequencies of the two input signals. The apparatus can be utilized to provide switching of optical signals and wavelength interchange for applications such as in wavelength division multiplexed communication systems.

20 Claims, 4 Drawing Sheets

METHOD AND APPARATUS FOR WAVELENGTH CONVERSION AND SWITCHING

This invention was made with United States government support awarded by the following agency: NSF ECS-9521228. The United States has certain rights in this invention.

FIELD OF THE INVENTION

This invention pertains generally to the field of optical electronic devices and particularly to optical devices of the type used in optical communication networks.

BACKGROUND OF THE INVENTION

Optical fiber communication networks are being increasingly utilized for both voice and data communication. Wavelength division multiplexing (WDM) has become the method of choice for increasing the data-carrying capacity of fiber optic systems. With WDM, many (typically from 4 to 40) data streams are carried along a single fiber, using a separate wavelength for each. Redirecting the flow of information in conventional fiber optic systems requires that the optical data streams be separated, converted to electronic signals, and then routed electronically to the next span of fiber in the network. The conversions from light to electronics to light greatly limits the speed and flexibility of present fiber optic systems. To better utilize the full potential of such optical networks, efforts have been directed to the development of optical switching devices which do not require conversion of the optical signal to an electrical signal. The challenges presented for such optical switching devices are particularly significant in communication networks which utilize WDM. In certain WDM applications, it is necessary to route carriers at different wavelengths to different locations based on the wavelength of the carrier. In other applications, it may be desirable to transfer the signal from a carrier at one wavelength to a carrier at a different wavelength.

SUMMARY OF THE INVENTION

In accordance with the invention, switching of optical signals and wavelength interchange of optical signals in optical communication systems is carried out without requiring conversion of the optical signals to electrical signals, thereby allowing the capabilities of the optical switching networks to be more fully utilized and minimizing the cost of electronic components. The invention may be utilized for wavelength sensitive routers, wavelength interchange cross connects, wavelength add/drop multiplexers, spectral inverters for dispersion compensation, facilitation of wavelength hopping for data encryption, inter-conversions between wavelength division and time division multiplexing, and may be extended to three dimensions to permit logic, arithmetic, and wavelength-shifting operations to be carried out on two-dimensional optical arrays for image analysis or to implement free-space interconnects.

The invention utilizes a lattice body comprising sensitized regions arranged in a two-dimensional array in a matrix material, wherein the sensitized regions differ from the matrix material in the sign of the second order susceptibility. Preferably, the sensitized regions and matrix material have the same first order susceptibility. The lattice body may be formed of various semiconductor materials and ferroelectrics such as $LiNbO_3$. Two optical signals at different carrier frequencies $\omega_1$ and $\omega_2$ are coupled into the lattice body to interact with the array. A pump signal having a frequency $\omega_p=\omega_1+\omega_2$ is also coupled into the lattice body with the two optical signals. These signals may be collinear with one another or may intersect in the lattice body. The spacing and pattern of the sensitized regions in the array in the lattice body are selected to interact with the three optical signals so that an optical signal exits from the lattice body that is angularly displaced from the direction of propagation of the input optical signals and that comprises an optical signal at a carrier frequency $\omega_2$ that carries the information on the input signal at the carrier frequency $\omega_1$. Another optical signal exits from the lattice body angularly displaced from the direction of propagation of the input optical signals that comprises an optical signal at a carrier frequency of $\omega_1$ that carries the information on the input signal at the carrier frequency $\omega_2$. These two angularly displaced signals may then be received and separated from each other, as well as from the input signals at the carrier frequencies $\omega_1$, $\omega_2$ and $\omega_p$ and cap which pass through the lattice body and exit without deflection from the initial input direction of propagation. When the pump signal is not applied to the lattice body, no wavelength interchange occurs, and the input signals at the frequencies $\omega_1$ and $\omega_2$ exit from the lattice body without change in the direction of propagation. Thus, by switching the pump signal on and off, the wavelength interchanged angularly diverging signals can be switched on and off.

Further, by utilizing a pump light signal intensity that has a larger magnitude than that of the input optical signals, the wavelength interchanged outputs can have a greater optical intensity than that of the input signals, thus effectively providing signal amplification.

The lattice body can comprise sensitized regions formed, for example, in ferroelectrics by periodic poling of the ferroelectric material, or in semiconductors by selective disordering, to provide an opposite sign of the second order susceptibility in the sensitized regions from that of the matrix material. Lateral waveguides may be formed on the lateral sides of the lattice body to receive and guide light that has been deflected from the longitudinal direction of the incoming light by interaction with the lattice.

Further objects, features and advantages of the invention will be apparent from the following detailed description when taken in conjunction with the accompanying drawings.

DETAILED DESCRIPTION OF THE INVENTION

Figure 1:
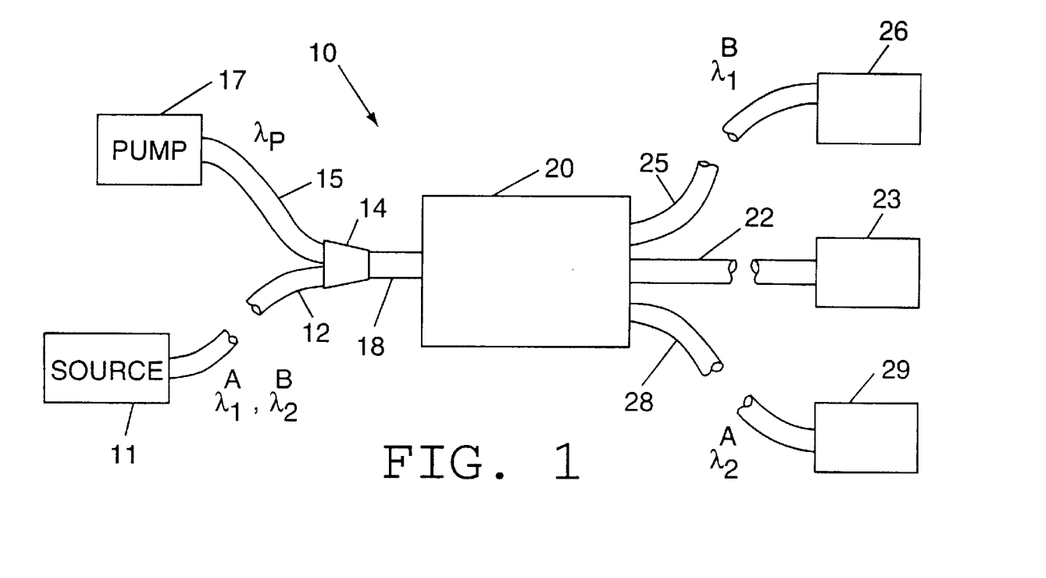
FIG. 1 is a schematic view of an optical communications network exemplifying the invention.

With reference to the drawings, a simplified diagram of an optical communications network exemplifying the application of the invention is shown generally at 10 in FIG. 1. The network 10 includes a source 11 which provides wavelength division multiplexed signal information onto an optical waveguide such as a fiber optic cable 12. The signal on the cable 12 includes at least two carriers at wavelengths $\lambda_1$ and $\lambda_2$ (equivalently, at frequencies ($\theta_1$ and $\theta_2$) which are separately modulated. The fiber optical cable 12 is connected to a coupler 14 which is also connected to a waveguide such as a fiber optic cable 15 that is selectively supplied with an optical signal at a wavelength $\lambda_p$ (frequency $\omega_p$) from a pump source 17. The coupler 14 provides an output on an input optical waveguide 18, e.g., a fiber optic cable, which is composed of the optical signals at the wavelengths $\lambda_1$, $\lambda_2$ and $\lambda_p$. The cable 18 is connected to an optical wavelength interchange apparatus 20 of the invention. The outputs of the device 20 are provided on a first output optical waveguide 22 such as an optical cable, which is connected to a utilization system 23 at which the signal is detected and utilized (and which may comprise a further network and further switching devices), on a second output optical waveguide 25 such as a fiber optic cable which is connected to a utilization system 26 (which again may be a further network), and on a third output optical waveguide 28 such as a fiber optic cable which is connected to a utilization system 29 (which may be a further optical network). In accordance with the invention, the output from the device 20 on the first output waveguide optical cable 22 comprises the unmodified input optical signal that was on the input waveguide cable 18, which includes the carriers at the wavelengths $\lambda_1$, $\lambda_2$ and the pump $\lambda_p$. As explained further below, when the pump source 17 is activated to apply the optical signal at the wavelength $\lambda_p$ which corresponds to a frequency $\omega_p=\omega_1+\omega_2$, the output optical signals on the two output optical waveguides 25 and 28 comprise optical signals at the wavelengths $\lambda_1$, and $\lambda_2$, respectively, which are thereby separated from one another. Further, the signals on the carriers are interchanged so that the optical signal at the carrier wavelength $\lambda_2$ now carries the information originally carried by the carrier at the wavelength $\lambda_1$, and the optical signal at the carrier wavelength $\lambda_1$ now carries the information that was carried by the carrier at the wavelength $\lambda_2$. Thus, the present invention selectively separates the carriers at the wavelengths $\lambda_1$ and $\lambda_2$ in the input waveguide signal from each other and interchanges the signal information on these carriers in the output signals. In the figures, the superscripts "A" and "B" indicate the signal information (modulation) of the carrier signals at the wavelengths $\lambda_1$ and $\lambda_2$.

In accordance with the present invention, a two dimensional (2-D) second-order nonlinear lattice is utilized in the device 20 for performing a simultaneous one-step optical carrier (i.e., wavelength) interchange between a selected pair (or selected pairs) of input optical signals from the cable 18, such as those carried in a fiber optic wavelength-division multiplexed communication system. In accordance with the invention, the interchange can be made to occur by means of two simultaneous difference-frequency generation (DFG) processes. The physical process takes advantage of the two-dimensional nature of the nonlinear lattice to selectively both quasi-phase match as well as spatially segregate the interchanged optical signal pair from the unconverted inputs ——the latter being essential since not all of the two input signals wavelength-exchange. The choice of the pump frequency is uniquely defined by the sum of the input signal frequencies. In the absence of the pump beam, no wavelength interchange takes place. Applications of the wavelength interchange process of the invention include wavelength sensitive routers, wavelength interchange cross connects, wavelength add/drop multiplexers, and spectral inverters for dispersion compensation. A particular advantage of the one-step optical carrier interchange process of the invention is that it simultaneously segregates the interconverted signals from the unconverted ones, thus eliminating coherent in-band crosstalk.

Figure 2:
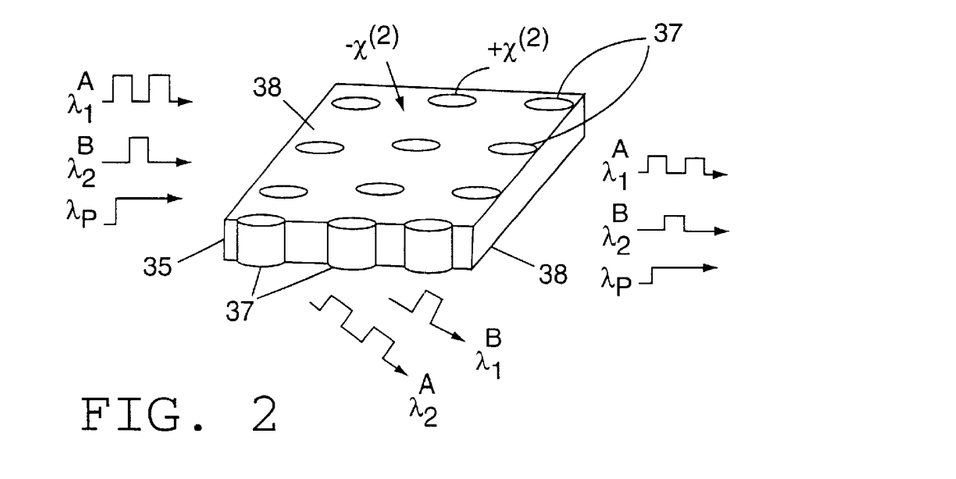
FIG. 2 is a simplified perspective view of a lattice body formed in accordance with the invention.

A schematic diagram of a 2-D second-order nonlinear lattice defined in a solid state body 35, and the resulting interchange process, is shown in FIG. 2. The lattice body 35 is incorporated in the wavelength interchange device 20 of FIG. 1, as discussed further below. In contrast to a conventional photonic crystal which possesses a periodic variation in the linear electric susceptibility, $\chi^{(1)}$, for the purpose of introducing a photonic band gap, the lattice body 35 shown in FIG. 2 possesses a 2-D periodic variation in the second-order nonlinear electric susceptibility $\chi^{(2)}$. The linear electric susceptibility in the lattice body structure 35 is preferably spatially invariant, and the lattice body 35 is preferably formed of a two-dimensional array of sensitized regions 37 (shown dark in FIG. 2) embedded in and surrounded by a matrix material 38 (shown light in FIG. 1). The 2-D$\chi^{(2)}$ pattern of sensitized regions 37 in a matrix 38 that comprises the lattice body 35 can be produced in, e.g., ferroelectrics, such as lithium niobate ($LiNbO_3$), using photolithographic and electric field poling procedures such as are used in one-dimensional variation structures. In such structures, the matrix 38 and the sensitized regions 37 are formed integrally of the same material, differing only in the sign of the second order non-linear susceptibility $\chi^{(2)}$. See, e.g., M. L. Bortz, et al., Optics Lett. Vol. 20, pp. 49, et seq. 1995. Appropriate lattices can also be formed in a semiconductor matrix, e.g., GaAs, as by selective disordering.

The governing equation for a material with a dominant second-order nonlinearity is $$\nabla^2 \vec{E}(\vec{r}, t) - \frac{n^2}{c^2} \frac{\partial^2 \vec{E}(\vec{r}, t)}{\partial t^2} = \mu_0 \chi^{(2)}(\vec{r}) \frac{\partial^2 \vec{E}(\vec{r}, t)}{\partial t^2} \quad (1)$$

where $\chi^{(2)}(\vec{r})$ is the spatially varying instantaneous second-order nonlinearity. We assume an electric field that is composed of three time-harmonic plane waves given by $$\vec{E}(\vec{r}, t) = \frac{1}{2}\{A_1(\vec{r}, t)\exp[i(\omega_1 t - \vec{k}_1 \cdot \vec{r})] + A_2(\vec{r}, t)\exp[i(\omega_2 t - \vec{k}_2 \cdot \vec{r})] + A_3(\vec{r}, t)\exp[i(\omega_3 t - \vec{k}_3 \cdot \vec{r})] + c.c.\} \quad (2)$$

where $\omega_i$ is the angular frequency and $\vec{k}_i(\omega_i)$ is the propagation constant vector of the $i^{th}$ optical wave, and each frequency-wavenumber pair satisfies the linear medium dispersion relation $$|\vec{k}_i|^2 - \frac{n_i^2}{c^2}\omega_i^2 = 0.$$

Substituting equation (2) into (1) and assuming the slowly varying envelope approximation, the DFG resonance condition $\omega_3 = \omega_1 - \omega_2$ yields the following set of coupled time-invariant equations (and their complex conjugates) that govern the spatial evolution of the wave amplitudes:

$$\vec{k}_1 \cdot \nabla A_1^* = \frac{1}{2} i \mu_0 \chi^{(2)}(\vec{r}) \omega_1^2 A_2^* A_3^* \exp[-i(\vec{k}_1 - \vec{k}_2 - \vec{k}_3) \cdot \vec{r}] \quad (3)$$

$$\vec{k}_2 \cdot \nabla A_2 = -\frac{1}{2} i \mu_0 \chi^{(2)}(\vec{r}) \omega_2^2 A_1 A_3^* \exp[-i(\vec{k}_1 - \vec{k}_2 - \vec{k}_3) \cdot \vec{r}]$$

$$\vec{k}_3 \cdot \nabla A_3 = -\frac{1}{2} i \mu_0 \chi^{(2)}(\vec{r}) \omega_3^2 A_1 A_2^* \exp[-i(\vec{k}_1 - \vec{k}_2 - \vec{k}_3) \cdot \vec{r}]$$

The nonlinear susceptibility $\chi^{(2)}(\vec{r})$ can be expanded as a Fourier series $$\chi^{(2)}_{bulk} \sum_G a_G \exp(i\vec{G} \cdot \vec{r}).$$

The required frequency and phase matching conditions for normal dispersive materials can now be expressed as $$\omega_3 = \omega_1^* - \omega_2 \quad (4)$$

$$\vec{k}_3(\omega_3) = \vec{k}_1(\omega_1) - \vec{k}_2(\omega_2) - \vec{G}$$

Here, $\vec{G}$ is the phase matching wave vector provided by the periodic nonlinearity $\chi^{(2)}(\vec{r})$ of the material. It can be shown (see, e.g., C. Kittel, *Introduction to Solid State Physics*, Wesley, New York, 1976) that if $\vec{a}$ and $\vec{b}$ are the real space basis vectors in the xy-plane of a two-dimensional periodic nonlinearity, then $\vec{G}$, a reciprocal lattice vector, is given by $$\vec{G} = m\vec{A} + n\vec{B} \quad (5)$$

where m, n = 0,1,2 ..., $\vec{A} = 2\pi \vec{b} \times \vec{c}/\vec{a} \times \vec{b} \times \vec{c}$ and $\vec{B} = 2\pi \vec{c} \times \vec{a}/\vec{a} \times \vec{b} \times \vec{c}$, and $\vec{c} = \vec{z}$.

The angle (2θ) between the input collinear waves ω1 and ω2) and the output wave (ω3) is related to the magnitudes of the wavevectors and the reciprocal lattice vector. From this relationship, we have derived the following general nonlinear Bragg condition for DFG ($\omega_3 = \omega_1 - \omega_2$) as well as SFG (sum-frequency generation: $\omega_3 = \omega_1 + \omega_2$):

$$\left(\frac{\lambda_3}{n_3}\right)_{SFG\text{-}DFG} = \frac{2\pi}{|G|}\sqrt{\left[1 - \left(\frac{n_1\lambda_2 \pm n_2\lambda_1}{n_3(\lambda_2 \pm \lambda_1)}\right)\right]^2 + 4\left(\frac{n_1\lambda_2 \pm n_2\lambda_1}{n_3(\lambda_2 \pm \lambda_1)}\right)\sin^2(\theta)} \quad (6)$$

where λi is the free space wavelength and ni is the refractive index of the material for the $i^{th}$ optical wave. Here, (±) is replaced by (+) for SFG and by (−) for DFG.

Consider two collinear optical data streams, EA(ωA) and EB(ωB), that are to be wavelength-interchanged (resulting in EA(ωB) and EB(ωA)). To accomplish the interchange, difference-frequency generation with a pump field Ep(ωp= ωA+ωB) is used, which is also collinear with the input signals. The electric field and its subscript designate the data stream information packet, and the angular frequency and its subscript give its carrier identity. A nonlinear version of the Ewald construction (see V. Berger, Phys. Rev. Lett., Vol. 81, 1998, pp. 4136 et seq.) can be used to determine the two periodicities of the lattice necessary to produce the two phase matching conditions between the pump and each of the input signals A and B, given by:

$$\omega_A = \omega_p - \omega_B \quad \vec{k}_A'(\omega_A) = \vec{k}_p(\omega_p) - \vec{k}_B(\omega_B) - \vec{G}_A \quad (7)$$

$$\omega_B = \omega_p - \omega_A \quad \vec{k}_B'(\omega_B) = \vec{k}_p(\omega_p) - \vec{k}_A(\omega_A) - \vec{G}_B$$

where $\vec{k}_A{}^1(\omega_A)$ is the wavevector of the new outgoing optical field generated by difference-frequency mixing between the pump and the input field EB(ωB) and now frequency-shifted to ωA. Similarly, $\vec{k}_B{}^1(\omega_B)$ is the outgoing wavevector corresponding to a frequency shifting of data stream EA(ωA→ωB).

Figure 3:
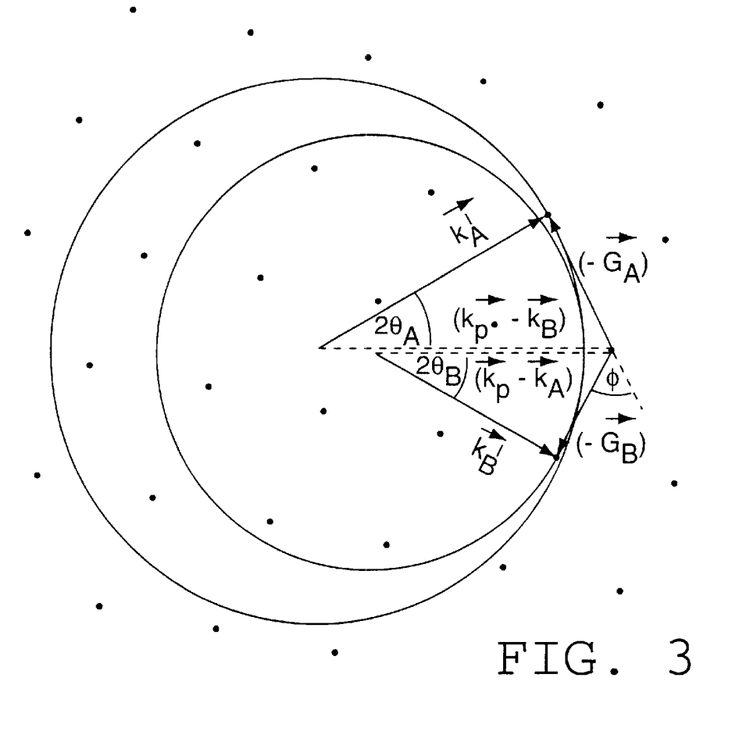
FIG. 3 a diagram showing a reciprocal space representation of a non-linear lattice designed to perform wavelength interchange.

To simplify the explanation, the two simultaneous processes may be analyzed independently. FIG. 3 is a representation of the reciprocal lattice of the nonlinear 2-D direct lattice. The wavevector difference of the two collinear optical fields Ep(ωp) and EB(ωB), $\vec{k}_p(\omega p) - \vec{k}_B(\omega B)$, is drawn in FIG. 3 with its endpoint on a reciprocal lattice point. The magnitude of the wavevector for the frequency exchanged output, $\vec{k}_A{}^1(\omega A)$, is represented as the radius of a circle (Ewald sphere in two dimensions) centered at the origin of the difference wavevector, $\vec{k}_p(\omega p) - \vec{k}_B(\omega_B)$ The wavevectors $\vec{k}_A{}^1(\omega_A)$ and $\vec{k}_A(\omega_A)$ are identical in magnitude but vary only in direction. If the Ewald sphere intersects a reciprocal lattice point, the reciprocal lattice vector $\vec{G}_A$ completes the quasi-phase matching for the difference-frequency generated light. The two Ewald spheres intersect at one common point only. The difference wavevector $\vec{k}_p - \vec{k}_A$, which overlaps $\vec{k}_p - \vec{k}_B$, is slightly displaced in FIG. 3 for purposes of visualization. The modulated light EB(ωA) will exit the lattice along the direction defined by $\vec{k}_A{}^1(\omega_A)$, a direction different from that of the input waves and pump. An identical analysis can be done for the second input EA(ωA) →EA(ωB) which is also shown in FIG. 3. It is also possible to design the lattice body such that the wavelength-interchanged outputs exit the lattice body on the same side (i.e., to the left or the right of the unconverted output signal stream, and at different angles so that the two wavelength interchanged outputs can be separated).

It can be shown that the real lattice spacings rA and $r_b$ in the two dimensions of the lattice are given by the relation $$r_{A,B} = \frac{2\pi}{|\vec{G}_{A,B}|\sin(\phi)} \quad (8)$$

where φ is the exterior angle subtended by $\vec{G}_A$ and $\vec{G}_B$ as shown in FIG. 3.

Furthermore, it can be shown that the interior angle subtended by rA and rb is also equal to φ. The following expression relates φ to the input wavelengths and desired exit angles:

$$\sin(\phi) = \left| \sqrt{\left(\frac{|\vec{k_A}|}{|\vec{G_A}|}\sin(2\theta_A)\right)^2 - \left(\frac{|\vec{k_A}|}{|\vec{G_A}|}\sin(2\theta_A)\frac{|\vec{k_B}|}{|\vec{G_B}|}\sin(2\theta_B)\right)^2} \pm \right.$$
$$\left. \sqrt{\left(\frac{|\vec{k_B}|}{|\vec{G_B}|}\sin(2\theta_B)\right)^2 - \left(\frac{|\vec{k_A}|}{|\vec{G_A}|}\sin(2\theta_A)\frac{|\vec{k_B}|}{|\vec{G_B}|}\sin(2\theta_B)\right)^2} \right| \quad (9)$$

In the equations above, $n_p$ is the refractive index for the pump signal, $n_A$ is the refractive index for the signal at the wavelength $\lambda_A$, $n_B$ is the refractive index for the signal at the wavelength $\lambda_B$, $\theta_A$ is a selected desired half exit angle with respect to a normal to an output face of the lattice body for the output signal at the wavelength $\lambda_A$, $\theta_B$ is a selected desired half exit angle with respect to a normal to the output face of the lattice body for the output signal at the wavelength $\lambda_B$, $|\vec{k_A}|=2\pi n_A/\lambda_A$, and $|\vec{k_B}|=2\pi b_B/\lambda_B$ and $|\vec{G_A}|$ and $|\vec{G_B}|$ are given by the general nonlinear Bragg condition (See Eqn. (6)). The operator (±) is replaced by (+) when $E_B(\omega A)$ and $E_A(\omega B)$ exit on opposite sides of the lattice and (−) when they exit on the same side of the lattice.

As an example of the invention, consider input fields at wavelengths λA=1550 nm and λB=1550.8 nm (100 GHz separation) that are to be simultaneously wavelength interchanged. An optical wavelength interchange device 20 for use with these wavelengths has a lattice body formed as an oblique nonlinear 25 lattice of sensitized regions 37 in dispersive $LiNbO_3$ that has real lattice spacings of 5.7 μm and 11.8 μm——a parallelogram with an interior angle of φ=43.8° ——produces frequency-shifted outputs that exit the lattice on opposite sides at angles of about 4.5° for $\vec{k_{A^1}}$ and about 10° for $\vec{k_{B^1}}$. For multiple input wavelengths, exchange occurs only for those input pairs for which the lattice is designed. In the absence of the pump light, all input waves pass straight through the lattice without any frequency conversion as long as the lattice is designed so that no efficient second harmonic generation occurs for the input waves. For a lattice body of $LiNbO_3$, the input light signals should be polarized perpendicular to the plane of the lattice body.

Since the Ewald spheres may intersect more than one reciprocal lattice point, there may be more than one direction in which quasi-phase matching is satisfied for each of the wavelengths. If it is desired to achieve quasi-phase matching in only one direction for each of the newly mapped wavelengths, there are two ways by which this can be achieved. The first method is an iterative one that involves the choice of lattice periodicity. For each pair of values of $\vec{G_A}$ and $\vec{G_B}$, two families of equations are generated. The intersecting points of these families of equations define all the lattice points in reciprocal space. The requirement now is to find a pair of $\vec{G_A}$ and $\vec{G_B}$ such that there is only one lattice point on each of the Ewald spheres. Once this pair is found, the exit angles can be determined from the general nonlinear Bragg condition (see, Eqn. (6)) and the real space parameters (see, Eqns. (8) and (9)). The alternative method is to manipulate the shape of the unit cell nonlinearity, or equivalently the reciprocal space "structure factor", $\chi^{(2)}_{bulk}{}^a{}_G$, upon which the efficiency of the difference-frequency generated light depends. By manipulating the structure factor, it is possible to nullify the output light in undesired directions.

Figure 4:
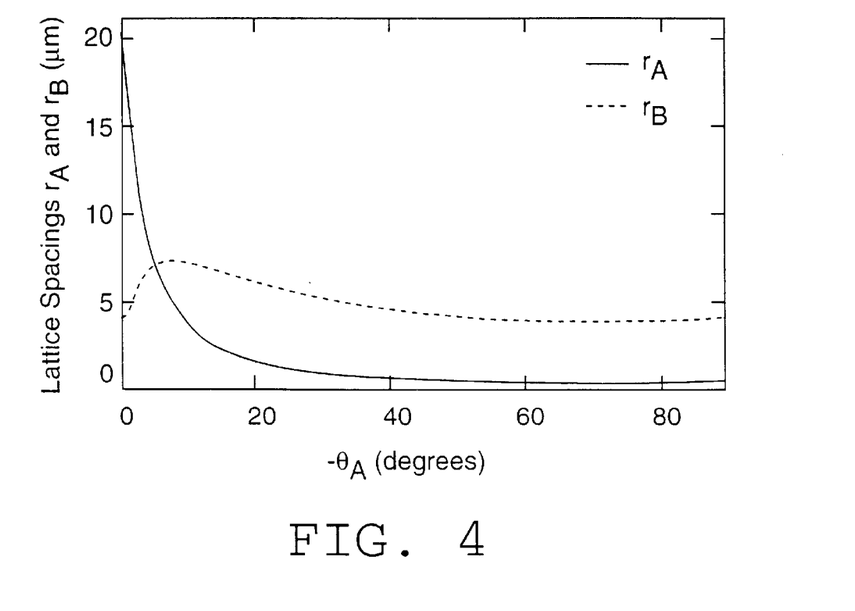
FIG. 4 is a graph of required real lattice spacings $r_a$ and $r_b$ versus of the half exit angle $\theta_a$ for wavelength interchange of two signals at $\lambda_a=1550$ nm and $\lambda_b=1550.8$ nm.

Depending on the input wavelengths and desired exit angles, the general nonlinear Bragg condition as given in equation (6) and equations (8) and (9) determine the required lattice spacings and pattern. FIG. 4 shows the range of lattice spacings required as a function of half the exit angle $\theta_A$ for the wavelength interchange $\lambda_A$=1550 nm↔$\lambda_B$=1550.8 nm, keeping $\theta_B$ fixed at 5°. That is, for this graph, $E_A(\omega_B)$ always exits the lattice at $2\eta_B$=10°. It can be seen from the graph that the smallest possible lattice spacing required is a ≈0.37 μm in the limit where $\theta_A$=90°. It is possible to form sensitized regions (microdomains) with diameters smaller than 0.5 μm in $LiNbO_3$, and domains as small as 5nm have been obtained in related ferroelectrics such as $BaTiO_3$. Fabrication of periodic microdomains can be performed by standard photolithographic processing. The behavior of $r_B$ as $\theta_A$ increases may also be noted: $r_B$ initially increases until $\theta_A$ is such that $\vec{G_A}$ is tangential to its corresponding Ewald sphere (see FIG. 3) and then monotonically decreases, and then increases until its final value is the same as its initial value when $\theta_A$=0.

The following is an example of the selection of the spacing and pattern of the sensitized regions in accordance with the invention.

Assume that it is desired to interchange the wavelengths λA=1.55 μm and λB=1.5508 μm in a nonlinear photonic crystal fabricated in lithium niobate, and that the wavelength-interchanged outputs are to appear at 4.5° (2θA) for kA and 10°(2θB) for kB, where kA,B are the wavevectors of the wavelength-interchanged outputs. In order to determine the lattice parameters, the following calculations are performed.

The pump wavelength required for such an interchange is given by $$\lambda_p = \frac{\lambda_A \lambda_B}{\lambda_A + \lambda_B} = \frac{1.55 \times 1.5508}{1.55 + 1.5508} = 0.775 \; \mu m$$

The refractive indices in lithium niobate for the signal and pump wavelengths are nA=2.16, nB=2.16, and np=2.2. It is then necessary to calculate the corresponding reciprocal lattice vectors GA and GB. The difference-frequency version of Eqn. (6) is used, the general nonlinear Bragg condition that was derived to find these vectors.

$$|G_A| = \frac{2\pi n_A}{\lambda_A} \sqrt{\left[1 - \left(\frac{n_p \lambda_B - n_B \lambda_p}{n_A(\lambda_B - \lambda_p)}\right)\right]^2 + 4\left(\frac{n_p \lambda_B - n_B \lambda_p}{n_A(\lambda_B - \lambda_p)}\right)\sin^2(\theta_A)} = 0.772$$

$$|G_B| = \frac{2\pi n_B}{\lambda_B} \sqrt{\left[1 - \left(\frac{n_p \lambda_A - n_B \lambda_p}{n_B(\lambda_A - \lambda_p)}\right)\right]^2 + 4\left(\frac{n_p \lambda_A - n_B \lambda_p}{n_B(\lambda_A - \lambda_p)}\right)\sin^2(\theta_B)} = 1.587$$

Eqn. (9) is now used to determine the value of sin(φ). The value of kA=2πnA/λA=8.756 and kB=2πnB/μB=8.751. This yields:

$$\sin(\phi) = \left| \sqrt{\left(\frac{|\vec{k_A}|}{|\vec{G_A}|}\sin(2\theta_A)\right)^2 - \left(\frac{|\vec{k_A}|}{|\vec{G_A}|}\sin(2\theta_A)\frac{|\vec{k_B}|}{|\vec{G_B}|}\sin(2\theta_B)\right)^2} + \right.$$

$$\left. \sqrt{\left(\frac{|\vec{k_B}|}{|\vec{G_B}|}\sin(2\theta_B)\right)^2 - \left(\frac{|\vec{k_A}|}{|\vec{G_A}|}\sin(2\theta_A)\frac{|\vec{k_B}|}{|\vec{G_B}|}\sin(2\theta_B)\right)^2} \right| = 0.69$$

The real space parameters are now given by derived Eqn. (8):

$$r_A = \frac{2\pi}{|\vec{G_A}|\sin(\phi)} = 11.761 \text{ μm}$$

$$r_B = \frac{2\pi}{|\vec{G_B}|\sin(\phi)} = 5.718 \text{ μm}$$

The interior angle subtended by rA and rB is:

$$\phi = \sin^{-1}(0.692) = 43.82°$$

Figure 5:
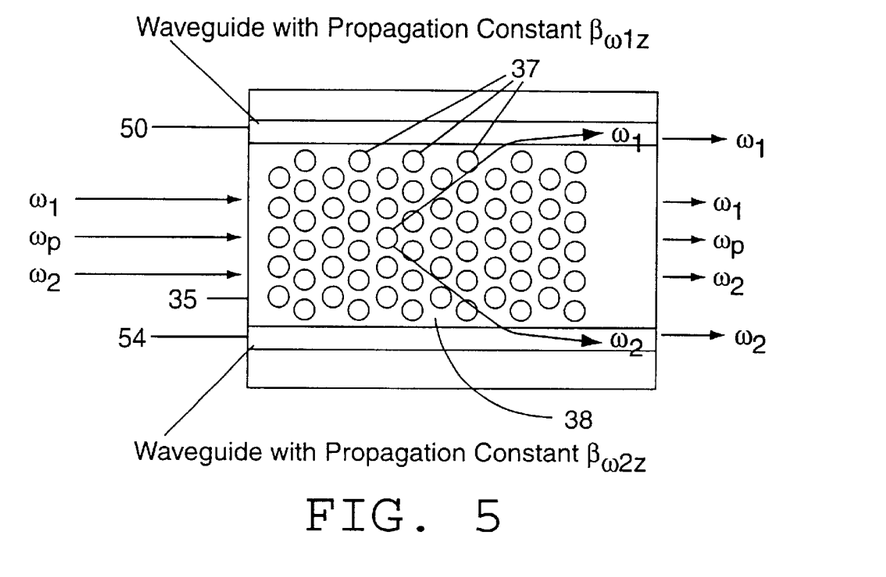
FIG. 5 is a diagram illustrating a lattice structure utilizing lateral waveguides for collecting and propagating the light deflected by the lattice.

FIG. 5 illustrates an exemplary structure for providing lateral confinement of the wavelength interchanged spatially separated light. The solid state body 35 in which the lattice of sensitized regions 37 is formed is bordered laterally by waveguides 50 and 51. If desired, the lattice body may also be formed between cladding layers (not shown) to provide transverse confinement of light to the lattice body. The waveguides 50 and 51 are preferably formed to have the same propagation constant as the z-component of the wave vector in the bulk crystal of the solid state body 35. When the three collinear input signals (at frequencies ($\omega_1$, $\omega_2$, and $\omega_p$) are passed into the body 35, the wavelength interchanged signal at the frequency $\omega_1$ is deflected into and confined within the waveguide body 50, while the wavelength interchanged signal at the frequency $\omega_2$ is deflected into and confined to the waveguide 51. The signals in the waveguides 50 and 51 then can exit the device at positions spatially separated from but propagating in the same direction as the original input signals at the wavelengths $\omega_1$, $\omega_2$, and $\omega_p$. This process is analogous to prism coupling. See, e.g., Topics in Applied Physics, Vol. 7, Integrated Optics, Springer Verlag, Berlin, 1979, pp. 83–134.

Figure 6:
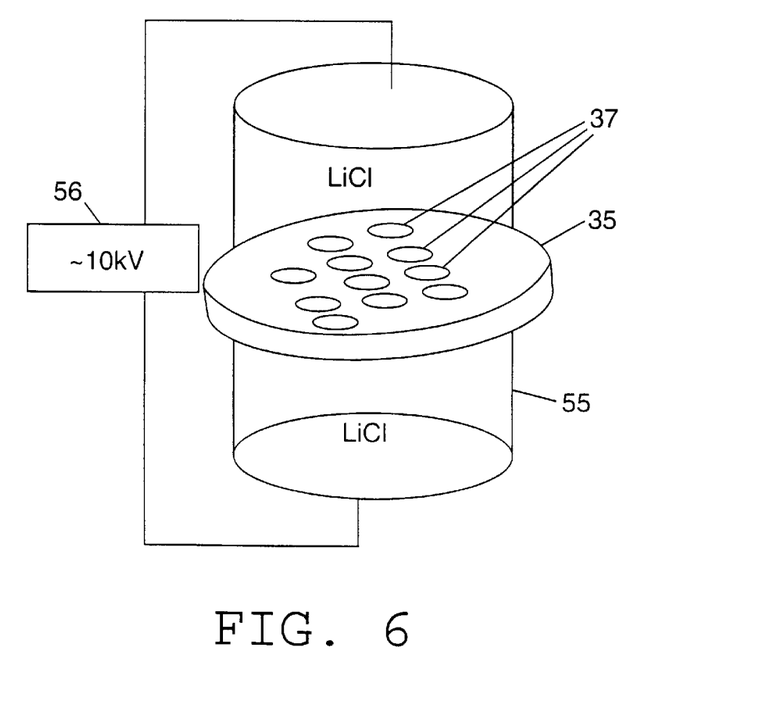
FIG. 6 is a diagram illustrating formation of the sensitized regions in a lattice body utilizing poling of a ferroelectric material, $LiNbO_3$.

As noted above, in the 1.0 to 1.6 μm wavelength region, the required periodicities of the sensitized regions in the lattice are about 5 to 10 μm, which can be readily produced utilizing standard photolithographic processes. The pattern of sensitized regions 37 can be readily produced in ferroelectrics, such as $LiNbO_3$, utilizing photolithographically-defined E-field poling processes, as illustrated in FIG. 6. The solid state body 35 (e.g., bulk $LiNbO_3$) is mounted in a reaction chamber 55 which holds a suitable reactant (e.g., LiCl for patterning a $LiNbO_3$ wafer). A power source 56 applies a high voltage to the reaction chamber 55 that is applied across the solid state body 35 to produce the sensitized regions utilizing conventional processing techniques. See, e.g., M. L. Bortz, et al., supra. The solid state body 35 may also be formed in ferroelectric thin films, which have a number of advantages over the bulk material. The inherently strong optical field confinement provided by thin films can result in much more efficient nonlinear interactions, and poling voltages are much lower, potentially permitting electrically programmable crystal structures. 2-D nonlinear photonic crystals may, for example, be formed in films made by wafer bonding and thinning $LiNbO_3$. An example of this structure is an ~50 μm thick $LiNbO_3$ film formed on a silicon substrate. Further, it is noted that it is possible to grow films of $LiNbO_3$ with excellent crystallinity using a modulated chemical beam epitaxy method. Such thin film epitaxy may be utilized to extend the nonlinear photonic crystals into three dimensions.

The wavelength interchange device of the present invention may be utilized for various applications and the invention may be embodied in related devices without departing from the spirit and scope of the present invention. One example is the use of the present invention to facilitate wavelength hopping for data encryption. The same process described above for wavelength routing can be used to shift portions of the data stream to new wavelengths. In this case, a data stream (analogous to a train) is composed of a set of packets (analogous to rail cars) of different wavelengths. This has the effect of intermixing or scrambling the data streams. The signals may then be decoded by reversing the process at the receiving end by utilizing a set of pumps that are activated in the reverse order.

The nonlinear photonic crystal can be extended to three dimensions to permit logic, arithmetic, and wavelength-shifting operations to be carried out on two-dimensional optical arrays for image analysis or to implement free-space interconnects. It is noted that the nonlinear domains in many ferroelectric films are in the nanoscale range (that is, in the range of about 10 nm), thus making it possible to provide sufficiently large phase matching to directly convert mid-infrared light to the visible for applications in imaging spectroscopy or to long wavelengths (>2 μm) for applications such as environmental sensing. It is also possible to use these optically nonlinear nanocrystals as digital 2-D holographic patterns, subsequent illumination of which by, e.g., an infrared beam, would generate a holographic image in the visible range by way of second harmonic generation.

The invention may be utilized to provide interconversions between wavelength division and time division. By properly choosing the pump wavelength and the direction of propagation of the pump, input and output optical data streams, two or more data streams, each at its own wavelength, may be converted to a common wavelength which exits a common port. This process amounts to conversion of WDM data to time division multiplexed (TDM) data. The reverse can also be achieved by reversing the directions of output and input data streams.

The same periodically oriented domains in a ferroelectric such as $LiNbO_3$ which give rise to wavelength interchange also will produce a periodic array of refractive index differences with application of a uniform electric field across the substrate. The result is a simultaneous 2-D (or 3-D) linear-plus-nonlinear photonic crystal. Such crystals may be utilized for their ability to steer the direction of the exiting light.

The nonlinear photonic crystals can also be used to perform $\chi^{(2)}:\chi^{(2)}$ cascading, thus mimicking a third order process. For three input signals at frequencies $\omega_1$, $\omega_2$, and $\omega_3$, one of the 2-D reciprocal lattice vectors can be designed to match $\omega_1+\omega_2$ while another reciprocal lattice vector can be designed to match $\omega_1+\omega_2-\omega_3$. The advantage of the 2-D nonlinear photonic crystal in comparison with its 1-D counterpart is that it has the ability to obtain pure optical products that are spatially segregated and free of other near-degenerate products. The interchange efficiency will depend upon the polarization of the input and pump beams (by way of the nonlinear susceptibility tensor of the lattice material).

The present invention also can be extended to three dimensional lattices having multiple layers of sensitized regions.

It should be understood that it is not essential in accordance with the invention for the input signals and the pump signal to be coupled into the lattice body collinear with one another as was illustrated in FIG. 1. As will be apparent from examination of the design equations given above, the lattice body can be selected to provide an appropriate angle of coupling of the input signals into the lattice body to provide wavelength interchanged output signals which exit either collinear with one another or exit at desired angles with respect to each other.

Figure 7:
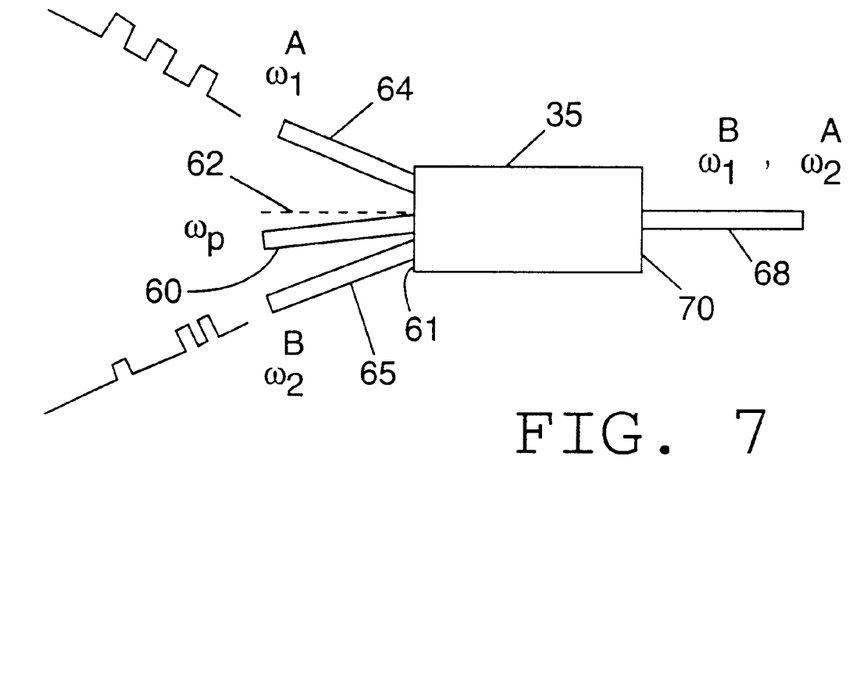
FIG. 7 is a schematic view of another embodiment of apparatus for wavelength interchange in accordance with the invention.
Figure 8:
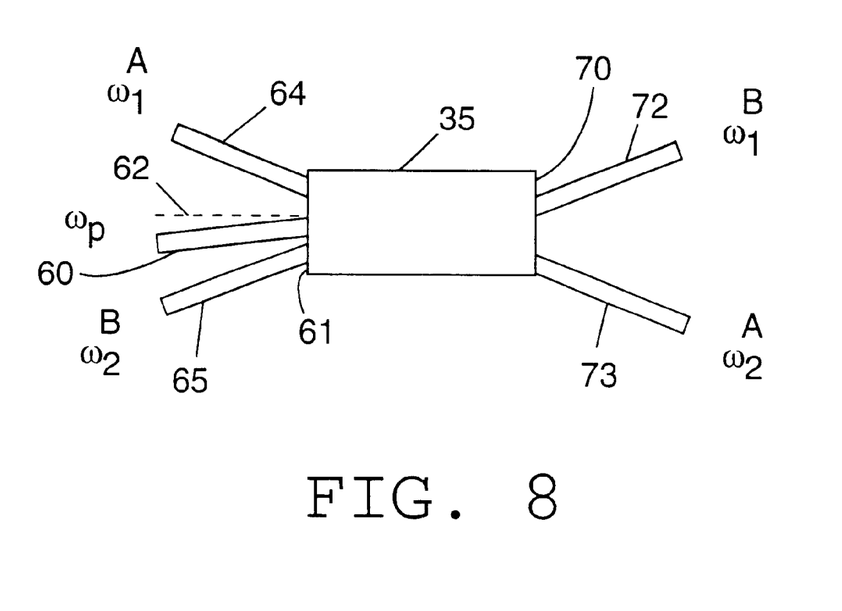
FIG. 8 is a schematic view of a further embodiment of apparatus for wavelength interchange in accordance with the invention.

To illustrate these principles, FIG. 7 shows the apparatus of the invention in which the input signals and the pump signal are not collinear with one another, but rather are coupled to the lattice body 35 at angles to each other. The optical waveguide 60 carrying the pump signal at the frequency $\omega_p$ is coupled to the input face 61 of the lattice body 35 at an angle with respect to a normal to the face 61 of the lattice body (illustrated by the dashed line labeled 62 in FIG. 7). An input waveguide 64 carrying one of the input signals at a frequency $\omega_1$ and a second input waveguide 65 carrying an input signal at a frequency $\omega_1$ are coupled to the input face 61 of the lattice body 35 at further angles off the normal 62 to the face of the lattice body. Utilizing a design criteria similar to that described above, the spacing and pattern of the sensitized regions in the lattice body 35 can be selected such that the signals carried by the waveguide 60, 64 and 65 will interact with the lattice where these signals intersect within the lattice body 35 to provide collinear output signals which are coupled to an output waveguide 68 at an angle which may be normal to the output face 70 of the lattice body 35 as shown, or at an angle, with the waveguide 68 carrying output signals at wavelengths $\omega_1$ and $\omega_2$ that are collinear with one another. This arrangement effectively both interchanges the information carried by the input signals at the frequencies $\omega_1$ and $\omega_2$ and also multiplexes the signals so that the two separate signals are now carried on a single output waveguide 68. As indicated by the nomenclature in FIG. 7, the information "A" carried by the input signal at the frequency $\omega_1$ is now carried by the signal at the frequency $\omega_2$ in the output, while the information "B" in the input signal at the frequency $\omega_2$ is carried in the output by the signal at the frequency $\omega_1$. The spacing and pattern of sensitized regions in the lattice body can also be selected to provide separated output signals, as illustrated in FIG. 8, wherein the output signal at the frequency $\omega_1$, exits from the lattice body 35 at an angle to the output face 70 of the lattice body and is received by a waveguide 72, while the output signal at the frequency $\omega_2$ exits at a different angle to the output face 70 and is received by a second output waveguide 73. In both cases, the output signals at the frequencies $\omega_1$ and $\omega_2$ are angularly separated from the pump signal provided on the input waveguide 60, which passes without deflection through the lattice body and exits at an angle different from the angles to the output face 70 of the lattice body at which the output signals at the frequencies $\omega_1$ and $\omega_2$ exit.

In all of the foregoing embodiments of the invention, it is understood that the apparatus in accordance with the invention may provide not only wavelength interchange of the input signals at the frequencies $\omega_1$ and $\omega_2$, but also parametric amplification of such signal where the pump signal at the frequency cop has greater intensity than the input signals. In fact, it is apparent that the apparatus of the invention may be utilized to carry out amplification of two input signals with or without wavelength interchange. For example, utilizing the apparatus of FIG. 1, the input signals can be separated into two angularly diverging output signals at frequencies $\omega_1$ and $\omega_2$, which are wavelength interchanged, which may then be supplied to the input waveguides 64 and 65 of the apparatus of FIG. 7 or FIG. 8 to provide amplified output signals in which the original carrier frequencies each carry their original information either collinear with each other, as for the apparatus of FIG. 7, or separated from one another, as for the apparatus of FIG. 8.

It is understood that the invention is not confined to the particular embodiments set forth herein as illustrative, but embraces all such modified forms thereof as come within the scope of the following claims.

What is claimed is:

1. Apparatus for simultaneous wavelength interchange of two optical signals of selected carrier frequencies $\omega_1$ and $\omega_2$ comprising:
   (a) a lattice body comprising sensitized regions arranged in a two-dimensional array in a matrix material, the sensitized regions differing from the matrix material in the sign of the second order susceptibility, the spacing and pattern of the sensitized regions in the array selected to provide wavelength interchange for two optical signals at frequencies $\omega_1$ and $\omega_2$;
   (b) at least one input optical waveguide coupled to the lattice body by which the input signals at the frequencies $\omega_1$ and $\omega_2$ and a pump signal at a frequency $\omega_p$ may be coupled into the lattice body; and
   (c) at least one output waveguide coupled to the lattice body in position to receive from the lattice body wavelength interchanged components of the input signals at least one of the frequencies $\omega_1$ and $\omega_2$.

2. The apparatus of claim 1 including a pump signal source coupled to an input waveguide to selectively provide an optical pump signal at a frequency $\omega_p=\omega_1+\omega_2$.

3. The apparatus of claim 1 wherein the lattice body is formed of $LiNbO_3$ and the sensitized regions are formed in the lattice body by periodic poling of the material of the lattice body to provide an opposite sign of the second order susceptibility in the sensitized regions from that of the matrix material surrounding the sensitized regions.

4. The apparatus of claim 1 wherein there are at least two output waveguides coupled to the lattice body to receive from the lattice body spatially diverging wavelength interchanged components of the input signals at the frequencies $\omega_1$ and $\omega_2$.

5. The apparatus of claim 1 including lateral waveguide regions formed on lateral sides of the lattice body to receive and guide light that has been deflected from the longitudinal direction of the incoming light by interaction with the lattice.

6. The apparatus of claim 1 wherein the input waveguide comprises a fiber optic cable and the output waveguides comprise fiber optic cables.

7. The apparatus of claim 6, including a pump source that selectively provides light at the pump wavelength $\omega_p=\omega_1+\omega_2$ to a fiber optic cable and thence to a coupler the output of which is connected to a fiber optic cable comprising the input waveguide and wherein the coupler also is connected to a fiber optic cable on which is transmitted a pair of optical signals at carrier frequencies $\omega_2$ and $\omega_2$ that are to be interchanged.

8. The apparatus of claim 6 further including a third output fiber optic cable coupled to the lattice body to receive the light from the input fiber optic cable that passes longitudinally through the lattice body without being deflected.

9. The apparatus of claim 1 wherein the centers of the sensitized regions have spacings $r_A$ and $r_B$ in the two dimensions of the lattice given by the relation:

$$r_{A,B} = \frac{2\pi}{|\vec{G_{A,B}}|\sin(\phi)}$$

where $\phi$ is the exterior angle subtended by the reciprocal lattice vectors $G_A$ and $G_B$ as well as the interior angle subtended by $r_A$ and $r_B$ and where $|G_A|$ and $|G_B|$ are the magnitudes of the reciprocal lattice vectors.

10. The apparatus of claim 1 wherein the sensitized regions and the matrix material have the same first order susceptibility.

11. The apparatus of claim 1 wherein the pairs of input optical signals have carrier wavelengths in the 1.0 to 1.6 $\mu$m wavelength range and the spacing between centers of sensitized regions in the lattice in the lattice body are in the range of about 5 to 10 $\mu$m.

12. The apparatus of claim 1 wherein a single input optical waveguide is coupled to the lattice body by which the input signals at the frequencies $\omega_1$ and $\omega_2$ and the pump signal may be coupled into the lattice body collinear with one another.

13. A method for carrying out simultaneous wavelength interchange between two modulated optical signals at different carrier wavelengths comprising:

(a) providing a lattice body comprising sensitized regions arranged in a two-dimensional array in a matrix material, the sensitized regions differing from the matrix material in the sign of the second order susceptibility, the spacing and pattern of the sensitized regions in the array selected to provide wavelength interchange for two optical signals at frequencies $\omega_1$ and $\omega_2$;

(b) coupling two input optical signals at the carrier frequencies $\omega_1$ and $\omega_2$ into the lattice body and coupling a third pump optical signal into the lattice body, the pump optical signal having a frequency $\omega_p$ selected to cause wavelength interchange in the lattice body between the two input optical signals;

(c) receiving an output optical signal exiting from the lattice body angularly displaced from the direction of propagation of the input optical signals that comprises an optical signal at a carrier frequency $\omega_2$ that carries the information on the input signal at the carrier frequency $\omega_1$, and receiving an output optical signal exiting from the lattice body angularly displaced from the direction of propagation of the input signals that comprises an optical signal at a carrier frequency $\omega_1$ that carries the information on the input signal at the carrier frequency $\omega_2$.

14. The method of claim 13 further including turning the pump signal on and off to switch on and off the signals exiting from the lattice body at an angle to the direction of propagation of the input signals to the lattice body.

15. The method of claim 13 wherein the optical signals at the carrier frequencies $\omega_1$ and $\omega_2$ and the pump signal at the frequency cop are coupled into the lattice body collinear with one another.

16. The method of claim 13 wherein the pump signal has a frequency $\omega_p=\omega_1+\omega_2$, and wherein in the step of receiving an optical signal at a carrier frequency $\omega_1$ that optical signal is angularly displaced from the direction of propagation of the output signal at the carrier frequency $\omega_2$.

17. The method of claim 13 wherein the sensitized regions in the lattice body have the same first order susceptibility as the matrix material.

18. Apparatus for simultaneous wavelength interchange of two optical signals of selected carrier frequencies $\omega_1$ and $\omega_2$ comprising:

(a) a lattice body comprising sensitized regions arranged in a two-dimensional array in a matrix material, the sensitized regions differing from the matrix material in the sign of the second order susceptibility and having the same first order susceptibility, the spacing and pattern of the sensitized regions in the array selected to provide wavelength interchange for two optical signals at frequencies $\omega_1$ and $\omega_2$ and wavelengths $\lambda_A$ and $\lambda_B$, respectively;

(b) at least one input optical waveguide coupled to the lattice body by which the input signals at the frequencies $\omega_1$ and $\omega_2$ and a pump signal at a frequency $\omega_p=\omega_1+\omega_2$ and wavelength $\lambda_p$ may be coupled into the lattice body collinear with one another;

(c) at least one output waveguide coupled to the lattice body in position to receive from the lattice body wavelength interchanged components of the input signals at least one of the frequencies $\omega_1$ and $\omega_2$; and (d) wherein the centers of the sensitized regions in the lattice body have spacings $r_A$ and $r_B$ in the two dimensions of the lattice given by the relation:

$$r_A = \frac{2\pi}{|\vec{G_A}|\sin(\phi)} \text{ and } r_B = \frac{2\pi}{|\vec{G_B}|\sin(\phi)}$$

where $\phi$ is the interior angle subtended by the vectors $r_A$ and $r_B$ and where $|G_A|$ and $|G_B|$ are the magnitudes of the reciprocal lattice vectors and are determined in accordance with:

$$|G_A| = \frac{2\pi n_A}{\lambda_A} \sqrt{\left[1-\left(\frac{n_p\lambda_B - n_B\lambda_p}{n_A(\lambda_B-\lambda_p)}\right)\right]^2 + 4\left(\frac{n_p\lambda_B - n_B\lambda_p}{n_A(\lambda_B-\lambda_p)}\right)\sin^2(\theta_A)}$$

$$|G_B| = \frac{2\pi n_B}{\lambda_B} \sqrt{\left[1-\left(\frac{n_p\lambda_A - n_B\lambda_p}{n_B(\lambda_A-\lambda_p)}\right)\right]^2 + 4\left(\frac{n_p\lambda_A - n_B\lambda_p}{n_B(\lambda_A-\lambda_p)}\right)\sin^2(\theta_B)}$$

and $$\sin(\phi) = \left| \sqrt{\left(\frac{|\vec{k_A}|}{|\vec{G_A}|}\sin(2\theta_A)\right)^2 - \left(\frac{|\vec{k_A}|}{|\vec{G_A}|}\sin(2\theta_A)\frac{|\vec{k_B}|}{|\vec{G_B}|}\sin(2\theta_B)\right)^2} \pm \sqrt{\left(\frac{|\vec{k_B}|}{|\vec{G_B}|}\sin(2\theta_B)\right)^2 - \left(\frac{|\vec{k_A}|}{|\vec{G_A}|}\sin(2\theta_A)\frac{|\vec{k_B}|}{|\vec{G_B}|}\sin(2\theta_B)\right)^2} \right|$$

where $n_p$ is the refractive index in the lattice body for the pump signal, $n_A$ is the refractive index in the lattice body for the signal at the wavelength $\lambda_A$, $n_B$ is the refractive index in the lattice body for the signal at the wavelength $\lambda_B$, $\theta_A$ is a selected desired half exit angle with respect to a normal to an output face of the lattice body for the output signal at the wavelength $\lambda_A$, $\theta_B$ is a selected desired half exit angle with respect to a normal to the output face of the lattice body for the output signal at the wavelength $\lambda_B$, $$|\vec{k_A}| = 2\pi n_A/\lambda_A, \text{ and}$$

$$|\vec{k_B}| = 2\pi n_B/\lambda_B.$$

19. The apparatus of claim 18 wherein the lattice body is formed of $LiNbO_3$ and the sensitized regions are formed in the lattice body by periodic poling of the material of the lattice body to provide an opposite sign of the second order susceptibility in the sensitized regions from that of the matrix material surrounding the sensitized regions.

20. The apparatus of claim 18 wherein the lattice body is formed of a semiconductor and the sensitized regions are formed therein by selective disordering.

* * * * *

UNITED STATES PATENT AND TRADEMARK OFFICE
CERTIFICATE OF CORRECTION

PATENT NO. : 6,433,919 B1
DATED : August 13, 2002
INVENTOR(S) : Chowdhury et al.

It is certified that error appears in the above-identified patent and that said Letters Patent is hereby corrected as shown below:

<u>Column 2,</u>
Line 19, please delete the words "and cap" which appear immediately after "$\omega_p$".

<u>Column 3,</u>
Line 14, delete "$(\theta_1$ and $\theta_2)$" and replace with -- $(\omega_1$ and $\omega_2)$ --.

<u>Column 5,</u>
Line 49, insert an initial parenthesis before "$\omega 1$ and $\omega 2)$", to appear as -- $(\omega 1$ and $\omega 2)$ --.

<u>Column 8,</u>
Line 15, delete "$2\eta_B=10°$" and replace with -- $2\theta_B=10°$ --.
Line 36, delete "$(2\theta A)$" and replace with -- $(2\theta_A)$ --.
Line 37, delete the phrase "kA and $10°(2\theta B)$ for kB, where kA,B are" and replace with -- $k_A{'}$ and $10°(2\theta_B)$ for $k_B{'}$, where $k_{A,B}{'}$ are --.
Line 49, delete "nA=2.16, nB=2.16, and np=2.2." and replace with -- $n_A=2.16$, $n_B=2.16$, and $n_P=2.2$. --.
Line 51, delete "GA and GB." and replace with -- $G_A$ and $G_B$. --.
Line 66, delete the phrase "kA=$2\pi$nA/$\lambda$A=8.756 and kB=$2\pi$nB/$\mu$B=8.751." and replace with -- $k_A=2\mu n_A/\lambda_A=8.756$ and $k_B=2\pi n_B/\mu_B=8.751$. --.

<u>Column 9,</u>
Line 20, delete "rA and rB" and replace with -- $r_A$ and $r_B$ --.

<u>Column 11,</u>
Line 23, delete "$\omega_1$" and replace with -- $\omega_2$ --.
Line 63, delete the word "cop" and replace with -- $\omega_p$ --.

<u>Column 12,</u>
Line 32, insert the word "at" between the words "at least" to appear as -- at at least --.
Line 60, delete the first occurrence of "$\omega_2$" and replace with -- $\omega_1$ --.

UNITED STATES PATENT AND TRADEMARK OFFICE
CERTIFICATE OF CORRECTION

PATENT NO. : 6,433,919 B1
DATED : August 13, 2002
INVENTOR(S) : Chowdhury et al.

It is certified that error appears in the above-identified patent and that said Letters Patent is hereby corrected as shown below:

<u>Column 13,</u>
Line 58, delete the word "cop" and replace with -- $\omega_p$ --.

Signed and Sealed this

Fourth Day of February, 2003

JAMES E. ROGAN
*Director of the United States Patent and Trademark Office*